Dec. 29, 1953  J. D. CONTI  2,663,982
APPARATUS FOR MAKING LINKED PRODUCTS
Filed June 25, 1951  4 Sheets-Sheet 1

INVENTOR.
JOHN D. CONTI
BY
*Thomas B. O'Nally*
ATTORNEY.

Dec. 29, 1953   J. D. CONTI   2,663,982
APPARATUS FOR MAKING LINKED PRODUCTS
Filed June 25, 1951   4 Sheets-Sheet 2

INVENTOR.
JOHN D. CONTI
BY
Thomas R. O'Nally
ATTORNEY.

Dec. 29, 1953  J. D. CONTI  2,663,982
APPARATUS FOR MAKING LINKED PRODUCTS
Filed June 25, 1951  4 Sheets-Sheet 3

INVENTOR.
JOHN D. CONTI
BY
ATTORNEY

Dec. 29, 1953　　　　　　　J. D. CONTI　　　　　　2,663,982
APPARATUS FOR MAKING LINKED PRODUCTS
Filed June 25, 1951　　　　　　　　　　　　　　　4 Sheets-Sheet 4
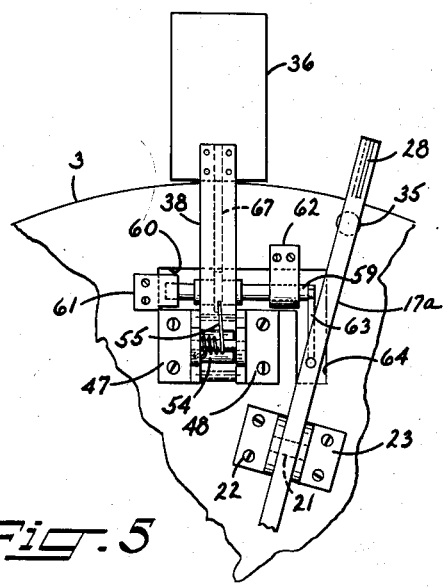
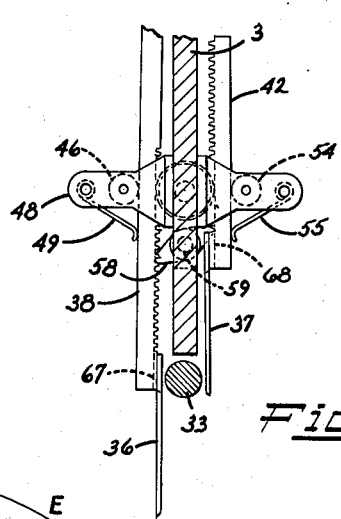
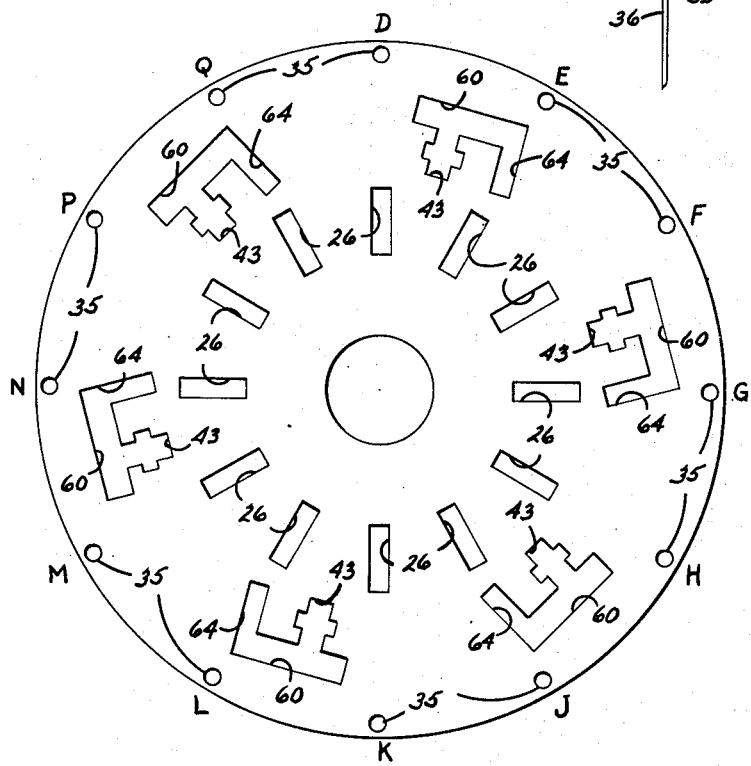
INVENTOR.
JOHN D. CONTI
BY
　　　Thomas B. O'Nally
　　　　　　　ATTORNEY.

Patented Dec. 29, 1953

2,663,982

UNITED STATES PATENT OFFICE 2,663,982

APPARATUS FOR MAKING LINKED PRODUCTS

John D. Conti, Elkins Park, Pa., assignor to American Viscose Corporation, Wilmington, Del., a corporation of Delaware Application June 25, 1951, Serial No. 233,435

20 Claims. (Cl. 53—156)

This invention relates to an apparatus for making linked products, such as sausages, frankfurters, and the like. More particularly the invention relates to an apparatus for linking continuously and quickly a continuous length of stuffed casing. The apparatus of the present invention is capable of forming links of varying lengths and sizes and in addition, the invention is capable of being employed in connection with a sausage stuffing machine in which a continuous length of stuffed product is discharged therefrom. The invention is also capable of being employed with a stuffing apparatus in which a predetermined length of stuffed product is discharged therefrom periodically, for example, an apparatus comprising a stuffing horn over which is shirred a pedetermined length of casing material, such as one formed from animal intestines. Further, the apparatus of the present invention is particularly adapted to be employed with a stuffing apparatus and it is adapted to be operated simultaneously and uniformly therewith to divide the continuous length of stuffed casing into uniform links.

While for the most part, for purposes of simplicity of description reference will be made to the preparation of linked sausage, it is to be understood that the invention is not limited to such stuffed products but is equally advantageous for the continuous production of encased stuffed products of plastic material, such as ice cream, fats, scrapple, and other meat products, as well as cheese, lard, oleomargarine, grease, snuff, caulking compound, and other products normally stuffed into casings, and in the specification and claims, the expression "stuffed products" is intended to include all such products.

Heretofore numerous types of apparatus have been proposed for linking stuffed products. For example, means have been provided for carrying or feeding a filled sausage casing to a certain position relative to the dividing and twisting mechanism and then holding the same in a stationary position while the dividing and twisting mechanism performs its function of linking the sausage. This type of apparatus is disadvantageous in that an intermittent feeding and stopping movement of the filled sausage casing occurs during the operation of the machine to form the same into links, and this continuous stopping of the sausage casing during its feeding movement and the resultant delay incurred while the linking mechanism performs its function greatly slows down the operation of linking the sausage to such a point that the same is but little, if any, better than the hand linking method.

Numerous machines have been proposed for linking sausage continuously, that is, without any intermittent stopping of the feeding mechanism to enable the linking mechanism to operate on the stuffed product. However, while some of these machines may have some peculiar or distinguishing advantages over and above other machines which perform the same function, there is still room for a great deal of improvement therein. The most important aspect to be attained in a continuous linking machine is increased production, that is, it is desirous to produce a compact and simply constructed device which is capable of linking stuffed products at a high rate of speed and at the same time, produce a linked product of high quality in so far as uniformity of size and compactness in the casing is concerned, etc.

It is a primary object of the present invention to provide a new and improved apparatus for linking a continuous length of a stuffed product, the resultant links being of uniform size and length, and the operation being carried out continuously, quickly, and smoothly without interruption.

It is another object of the invention to provide a new and improved apparatus for producing linked sausage, frankfurters, and the like, which is compact, simple of construction, easily moved from one place to another for installation, and readily adaptable to be used with continuous sausage stuffers or stuffing apparatus.

It is a specific object of the present invention to provide a new and improved linking apparatus which is capable of linking stuffed products at speeds up to 300 links per minute or more.

Other objects and advantaegs of the present invention will be apparent from the drawing and description thereof hereinafter.

In order that the invention may be clearly understood, reference should be had to the accompanying drawing which illustrates practical embodiments of the invention, and in which.

Figure 1:
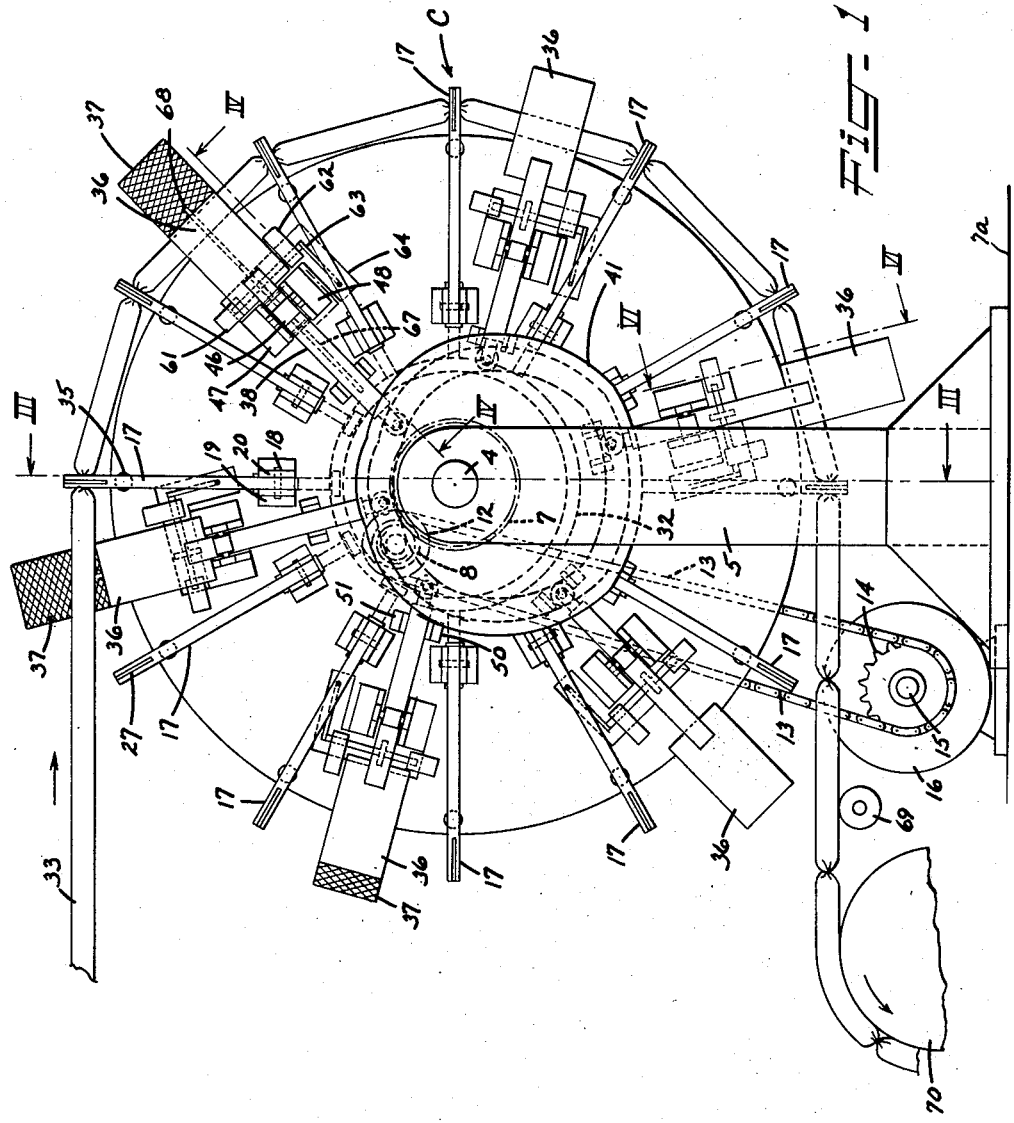
Figure 1 is a side view taken from the left in Figure 3.
Figure 2:
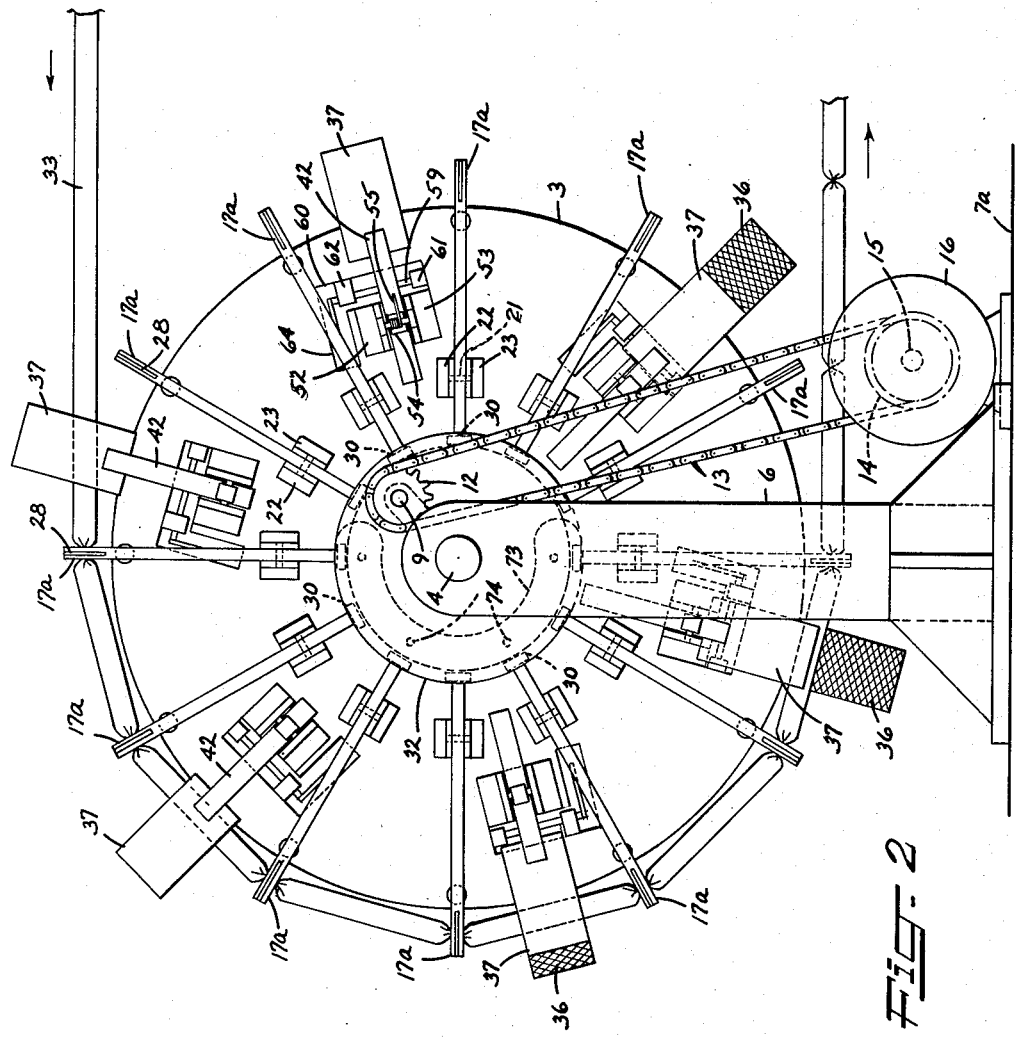
Figure 2 is a side view taken from the right in Figure 3.
Figure 3:
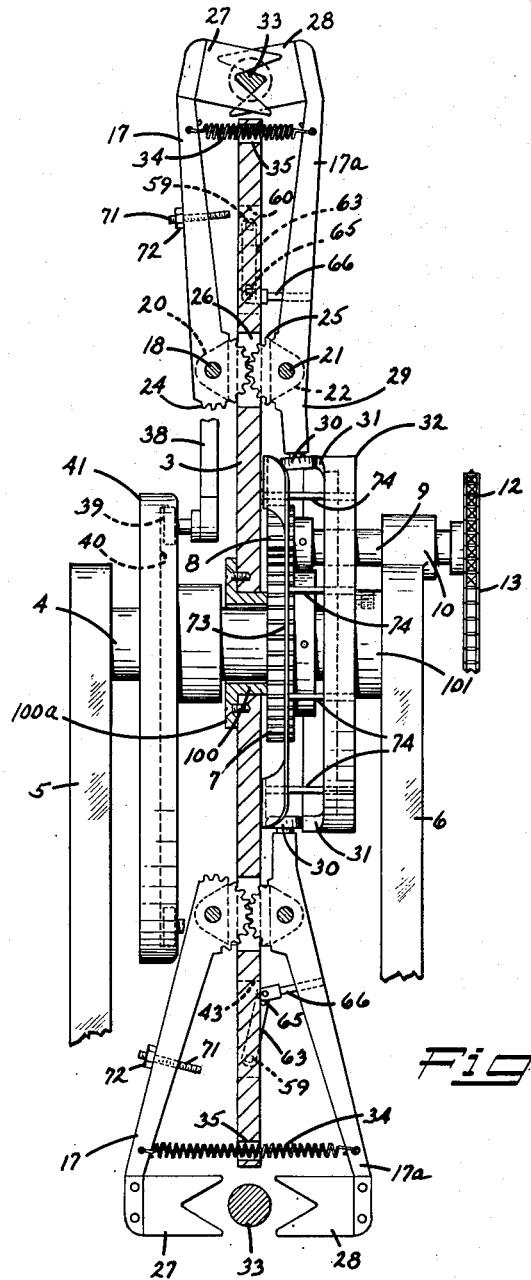
Figure 4:
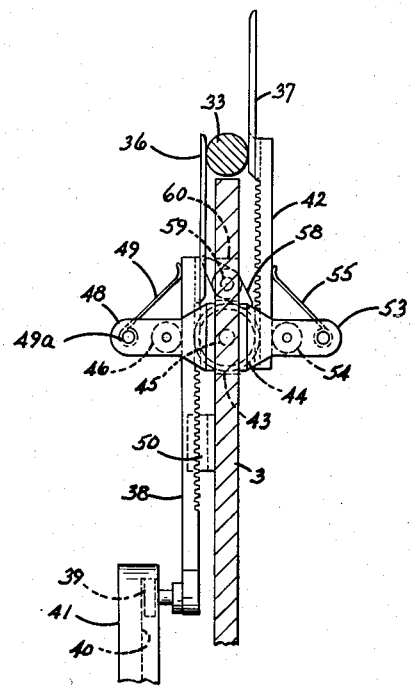

Figure 3 is a view partly in section taken on line III—III of Figure 1 but on a somewhat enlarged scale, Figure 4 is an enlarged view taken along the line IV—IV of Figure 1, Figure 5 is an enlarged view of a portion of Figure 2, Figure 6 is an enlarged sectional view, taken on line VI—VI of Figure 1 showing the twisting means in position to release the stuffed product therefrom, and Figure 7 is a view of the plate or plate-like member with the various parts attached thereto removed in order to show the openings therein.

In general the objects of the present invention are accomplished by passing a continuous length of stuffed product in tangential contact with a plate-like member which may have any desired peripheral shape, but is preferably cylindrical, mounted on its axis for positive rotation thereabout. At periodically predetermined intervals, the continuous length of stuffed product is clamped by clamping means extending outwardly from the periphery of the member and every other section in between such clamping means is positively rotated by paddle-like members fastened to both sides of the plate-like member and resting against the sides of the stuffed product. The clamping and twisting operation takes place continuously while the plate-like member is being rotated. The continuous length of stuffed product remains in contact with the clamping means and twisting means extending outwardly from the periphery of the plate-like member while the latter is rotated through an arc. During this time, the stuffed product is linked and then automatically released by the above mentioned means and during the remainder of the arc of revolution, before again coming in contact with the continuous length of stuffed product, the clamping and twisting means are returned automatically to operative position.

As will be apparent from the detailed description of the invention hereinafter, the plate-like member may be of any convenient size, depending on the space available at the point of installation, and any convenient number of links may be in process of formation at any given time on the periphery of the rotating member. All of these factors will be dependent upon the speed with which the stuffed product is fed to the rotating member as well as the size and length of the individual links it is desired to produce. In the embodiment shown and described herein, the plate-like member is divided up in such a manner that 6 links of equal length can be accommodated or produced at any given time about the entire periphery thereof. It is to be understood, however, that this is merely for purposes of illustration and the invention is not to be limited thereby but only in so far as the same may be limited by the appended claims.

Referring to Figures 1, 2, 3, and 7, the apparatus comprises a cylindrical plate or plate-like member 3 mounted for rotation on shaft 4 which in turn is mounted on the supporting brackets 5 and 6 resting on floor 7a or any other suitable support, such as a table, bench, or the like. The plate-like member 3 is mounted on the sleeve 100 on shaft 4 and is bolted or otherwise fastened to the flanged portion 100a of the sleeve. The plate-like member 3 rotates about shaft 4 and is driven by means of gear 7 also mounted on sleeve 100 which is in mesh with the gear 8 on shaft 9. The shaft 9 is supported by the bracket 10 fastened to bracket 6. Also mounted on shaft 9 is a sprocket 12 which is connected by chain 13 to the sprocket 14 on the shaft 15 of the drive motor 16.

Extending outwardly from the periphery of plate 3 are a plurality of cooperating pairs of clamping, pinching, or squeezing members 17 and 17a. These clamping or pinching members or levers are mounted pivotally on the face of the plate 3. For example, in Figure 1 the members 17 are mounted on shafts 18 which in turn are mounted in the bearings 19 and 20 fastened to the face of plate 3 and in Figure 2 the members 17a are mounted on shafts 21 which in turn are mounted in the bearings 22 and 23 (see Figure 3). The lower portions of each of the clamping members 17 and 17a terminate in the sector gears 24 and 25 respectively which extend through the openings 26 in plate 3 in mesh with each other. The upper ends of the members or levers 17 and 17a have V-shaped plates, or clamping members or jaws 27 and 28 respectively attached thereto.

Referring particularly to Figure 3 there can be seen the downwardly extending portion 29 of member 17a which has a rotatable cam follower 30 attached to the end thereof. The follower 30 rides on the face 31 of cam 32 which is keyed to shaft 4 by the collar 101 attached thereto.

The sausage or stuffed product 33, coming from the stuffing apparatus or other source of supply, comes into contact with the clamping members 17 and 17a at the top of plate 3, as shown in Figures 1 and 2. As the plate 3 is rotated in a clockwise direction, the clamping members 17 and 17a move toward each other and clamp the stuffed product therebetween. This is caused by the action of the roller 30 on the cam face 31 and the action of the tension spring 34 which is fastened between the upper ends of the clamping members 17 and 17a, extending through the opening 35 in the plate 3. Due to the sector gears 24 and 25 being in mesh, both clamping members 17 and 17a are rotated relative to one another.

Referring to Figures 1, 2, and 4 there can be seen the twisting means which are positioned between every other set of clamping members. The twisting means comprises two paddle-like members 36 and 37 positioned on either side of the plate 3 which are urged into contact with the stuffed product therebetween. Attached to the members 36 and acting as supports therefor, are racks 38 at the other end of which cam followers 39 are fastened. The cam followers 39 ride in the groove 40 in the face of cam 41 which is keyed to shaft 4. The paddle-like members 37 are supported by the racks 42 on the opposite side of plate 3 from that shown in Figure 1. Mounted for rotation in the openings 43 in plate 3 are pinions 44 mounted on shafts 45. Each of the racks 38 and 42 is in mesh with a pinion 44 on either side of the plate 3. The racks 38 are held against pinions 44 by means of the rollers 46, fastened between the brackets 47 and 48 on the face of plate 3, and the springs 49, wound about shafts or supports 49a, with the ends thereof resting against the racks 38. Guides 50 and 51 are fastened to the face of plate 3 on either side of the racks 38 to prevent side to side movement thereof.

The paddle-like members 37 are similarly supported by means of brackets 52 and 53, rollers 54, and the springs 55, the racks 42 being held in mesh with the pinions 44.

As is shown in Figure 4 the paddle-like members and racks are oppositely positioned, that is, when one of the members is up, the other is down. Also, the face of the paddle-like member which comes into contact with the stuffed product is preferably roughened or corrugated to insure sufficient friction between it and the smooth stuffed product casing. For example, a thin corrugated or smooth strip or sheet of rubber, or the like resilient material, may be fastened to the inner face of the paddle-like member by means of an adhesive, or the like.

Mounted between each pair of paddle-like members and racks is a cam 58 on shaft 59 which is mounted in the opening 60 in plate 3. The shaft is supported at one end by bearing 61 and passes through the bearing 62. At the other end of shaft 59, there is rigidly fastened a lever 63 positioned in the opening 64 in plate 3. In the lower end of lever 63 there is a slot 65 (see Figure 3) in which is fastened a lever 66 which is in turn fastened at its other end to the clamping member 17a. The cam 58 serves the purpose of removing the paddle-like members from contact with the stuffed product therebetween when it is desired to remove the linked product from the apparatus. It is to be noted that the links or levers 63 are fastened to the clamping members which precede the twisting members or paddle-like members in the direction of travel of the stuffed product. Thus, due to the action of cam 32, when the clamping members 17a are moved back out of contact with the stuffed product, that is to the right as viewed in Figure 3, shaft 59 is rotated in a clockwise direction, as viewed in Figure 6, thus rotating cam 58 into contact with the racks 38 and 42 spreading them apart and releasing the stuffed product from therebetween. It is to be noted that there are grooves 67 and 68 cut in the center of the inner faces of racks 38, paddle-like members 36 and racks 42 and paddle-like members 37 respectively, through which the cam 58 passes as the paddle-like members are actuated.

As the linked stuffed product is released by the clamping members and the twisting members, it passes over a guide roll 69 and is wound upon a drum 70. However, if desired, the sausage or other product may be passed into suitable containers, such as shipping cartons, or the continuous length of linked stuffed product may be passed into baking ovens, or other similar treating apparatus. Thus it can be seen that the present apparatus is particularly useful in the continuous production of linked stuffed products, such as sausages, frankfurters, and the like.

In connection with the following description of the operation of the apparatus, reference should be had to all of the figures of the drawing and in particular to Figures 1 and 7 thereof. As can be seen in Figure 1, the twisting or paddle-like members and the clamping members are equally spaced around the plate or plate-like member 3. In Figure 7, the positions of the clamping members 17 and 17a have been designated by the letters D, E, F, G, H, J, K, L, M, N, P, and Q. The space between each of the designated positions, in the embodiment shown, amounts to a distance of 30° and the distance between each pair of paddle-like members is 60°.

When the stuffed product 33 comes into contact with the first pair of clamping members 17, 17a at position D, the members are beginning to close and upon reaching position F they are completely closed. The next succeeding pair of clamping members 17, 17a at positions E, are almost completely closed so that the portion of the stuffed product between positions E and F has now assumed the form of a link.

When the clamping members are at positions E and F, the twisting means or paddle-like members 36 and 37 therebetween, through the action of cam 41, are in position to begin the twisting operation. That is, paddle-like member 36 is in its lowermost position, as shown in Figure 1, and paddle-like member 37 is in its uppermost position. As the plate 3 is rotated, rack 38, by reason of the follower 39 riding in the channel or groove 40, is forced in an upward direction and in so doing rotates the pinion 44 which in turn forces the rack 42 and the paddle-like member 37 attached thereto in a downward direction. Since the portion of the sausage or other stuffed material between the clamping or pinching members immediately preceding and following the twisting means is held in fixed position, the portion of the stuffed material between the twisting means is rotated by the action of the paddle-like members 36 and 37, the casing held by the members 17 and 17a being twisted therebetween.

By the time the paddle-like member 36 has reached a position between J and K it has reached its uppermost position and the twisting action is thus completed. The clamping members 17, 17a, upon passing the position K, are forced apart through the action of the cam follower 30 riding on the cam face 31 of cam 32 thus releasing the stuffed product from therebetween. At the same time that clamping member 17 is moved away from the stuffed product, shaft 59 (Figures 5 and 6) is rotated in a clockwise direction through the action of lever 63. This causes the cam 58 to force the racks and paddle-like members apart thus releasing the stuffed material from therebetween. All of this action takes place as the clamping members and the twisting means pass position K.

After thus releasing the stuffed product, the clamping means or members 17, 17a are opened completely and remain that way until they reach position D whereupon they again begin to close. The paddle-like members 36 and 37, open while passing position K thereby releasing the stuffed product and then return to their starting position through the action of cam 41, that is, member 36 is returned to its lowermost position and member 37 is returned to its uppermost position, all of this action taking place as the members pass through positions L, M, N, P, and Q. Thus, the members 36 and 37 are again in position to twist another section of the stuffed product upon reaching position D.

It will readily be understood that it is only necessary to positively twist every other section of the stuffed product around the periphery of plate 3. The clamping members 17 and 17a grasp the stuffed product therebetween in such a manner as to reduce the diameter thereof to approximately ⅛ inch. However, by means of the adjustable and threadedly mounted stops 71 fastened to the clamping members 17 and adjustable by means of the lock nut 72, as shown in Figure 3, the distance between the V-shaped plates 27 and 28, when in clamping position, may be varied as desired. The stops 71 contact the face of plate 3 thus preventing any further movement of the clamping members 17 and 17a toward the stuffed material.

In order to prevent any undue movement or vibration of the clamping members 17, 17a, an arcuate plate or member 73 is fastened to cam 32 opposite the low portion thereof by means of the brackets 74. The cam follower 30 when passing over the low portion of cam 32 contacts both the member 73 and the face 31 of cam 32. While in the embodiment shown and described herein the plate 3 is rotated about shaft 4, the shaft may be rotated and the plate 3 keyed to the shaft. In this case, the cams 32 and 41 would not be keyed to the shaft 4.

As previously pointed out, the present invention is capable of producing linked stuffed products at rates up to 300 links per minute or more. The apparatus is compact, simple in construction and operation, and readily movable from one place to another. In addition, there are no intricate or delicate parts which may be easily damaged.

It is to be understood that changes and variations may be made without departing from the spirit and scope of the invention as defined in the appended claims.

I claim:

1. An apparatus for forming a stuffed product into a series of integrally connected links comprising a shaft, a rotatable member mounted on the shaft, a plurality of cooperating stuffed product clamping means mounted on the member and extending outwardly from the periphery thereof, said clamping means being spaced at intervals around the member, means adjacent the member for moving the clamping means into and out of engagement with the stuffed product to form it into linked sections, a plurality of stuffed-product twisting means mounted on the member for rotating alternate sections of the stuffed product, each of said twisting means being spaced between an adjacent pair of clamping means, said twisting means comprising a pair of opposed elements one on each side of the member, racks on the elements, a pinion, means for urging the racks to engage the pinion, and means adjacent the member for actuating the racks and pinion, and means for rotating the member.

2. An apparatus as defined in claim 1 wherein the member is a circular plate.

3. An appaartus as defined in claim 1 wherein the clamping means and twisting means are mounted on both faces of the member and the clamping means are approximately equi-distantly spaced about the member and the twisting means are approximately equi-distantly spaced thereabout.

4. An apparatus as defined in claim 1 comprising means connected to the clamping means for disengaging the racks from the pinion whereby to disengage the twisting means from the stuffed product.

5. An apparatus as defined in claim 1 wherein the means for disengaging the twisting means from the stuffed product comprises a cam mounted for rotation between the twisting means on a shaft mounted in an opening in the member, and a lever interconnecting said shaft to the adjacent clamping means.

6. An apparatus for forming a stuffed product into a series of integrally connected links comprising a shaft, a rotatable generally circular plate-like member mounted on the shaft, a plurality of cooperating stuffed product clamping means mounted on both faces of the member and extending outwardly from the periphery thereof, said clamping means being approximately equi-distantly spaced apart around the member, means adjacent the member for moving the clamping means into and out of engagement with the stuffed product, a plurality of stuffed product twisting means mounted on both faces of the member for rotating spaced segments of the stuffed product, said twisting means being approximately equi-distantly spaced apart around the member between adjacent pairs of clamping means, means adjacent the member for actuating the twisting means, means connected to the clamping means for disengaging the twisting means from the stuffed product, and means operatively connected to the member for rotating the member.

7. An apparatus as defined in claim 6 wherein each clamping means comprises a pair of opposed levers, each pivotally mounted on an axis parallel to the plane of the member, each lever having a sector gear extending through an opening in the member into engagement with the sector gear of the corresponding opposed lever.

8. An apparatus as defined in claim 7 wherein the means for moving the clamping means comprises a stationary cam mounted on the shaft and a cam follower arm secured to one lever of each pair thereof.

9. An apparatus as defined in claim 7 wherein the means for actuating the twisting means comprises a cam mounted on the shaft.

10. An apparatus as defined in claim 7 wherein the twisting means comprises paddle-like members fastened to racks slidably mounted on both faces of the member and in mesh with a pinion mounted in an opening in the member.

11. An apparatus for forming a stuffed product into a series of integrally connected links comprising a shaft, a rotatable generally circular plate-like member mounted on the shaft, a plurality of pairs of cooperating lever means for clamping the stuffed product, said lever means being pivotally mounted on both faces of the member and extending outwardly from the periphery thereof, said pairs of lever means being approximately equi-distantly spaced apart around the member and having sector gears integrally attached to the bottom ends thereof, the sector gears of each pair of cooperating lever means being in mesh in an opening in the member, cam means on the shaft for rotating the lever means about their pivotal axes into and out of engagement with the stuffed product, a plurality of stuffed product twisting means each comprising a pair of radially movable plates mounted on both faces of the member, said twisting means being alternately and approximately equi-distantly spaced apart around the member between adjacent pairs of lever means, means adjacent the member for actuating the twisting means, means connected to the lever means for disengaging the twisting means from the stuffed product, and means operatively connected to the member for rotating the member at a constant speed.

12. An apparatus as defined in claim 11 wherein the means for disengaging the twisting means from the stuffed product comprises a cam mounted for rotation between the twisting means on a shaft mounted in an opening in the member, said shaft being connected by a lever to the adjacent lever means for clamping the stuffed product.

13. An apparatus for forming a stuffed product into a series of integrally connected links comprising a shaft, a rotatable generally circular plate mounted on the shaft, a plurality of cooperating stuffed product clamping means mounted on both faces of the plate and extending outwardly from the periphery thereof, said clamping means being approximately equi-distantly spaced around the plate, means adjacent the plate for moving the clamping means into and out of engagement with the stuffed product, a plurality of stuffed product twisting means mounted on both faces of the plate for movement outwardly from and inwardly toward the peripheral surface of the plate, said twisting means comprising paddle-like members fastened to racks slidably mounted on both faces of the plate, each rack on one face of the plate being positioned opposite a rack on the other face, said oppositely positioned racks being in mesh with a pinion mounted in an opening in the plate, said twisting means being alternately and approximately equi-distantly spaced around the plate between successive clamping means, cam means on the shaft adjacent the plate for actuating the twisting means, means connected to the clamping means for disengaging the twisting means from the stuffed product, and means operatively connected to the plate for rotating the plate.

14. An apparatus as defined in claim 13 wherein the means for disengaging the twisting means from the stuffed product comprises a cam mounted for rotation between the racks on a shaft mounted in an opening in the plate, said shaft being connected by a lever to the adjacent clamping means.

15. An apparatus for forming a stuffed product into a series of integrally connected links comprising a shaft, a rotatable generally circular plate mounted on the shaft, a plurality of pairs of cooperating levers for clamping the stuffed product pivotally mounted on both faces of the plate and extending outwardly from the periphery thereof, said levers being approximately equi-distantly spaced around the plate and having sector gears integrally attached thereto adjacent their inner ends, the sector gears of each pair of cooperating levers being in mesh in an opening in the plate, a stationary cam on the shaft for rotating the levers about their pivotal axes into and out of engagement with the stuffed product, twisting means comprising a plurality of racks slidably mounted on both faces of the plate and having flat-faced members fastened to the ends thereof, each rack on one face of the plate being positioned opposite a rack on the other face, said oppositely positioned racks being in mesh with a pinion mounted in an opening in the plate and relatively movable radially of the plate, said racks being alternately and approximately equi-distantly spaced around the plate between successive pairs of levers, a stationary cam on the shaft adjacent the plate for actuating the pinion, means connected to one of the levers for disengaging the members from the stuffed product after completion of the twisting thereby, and means operatively connected to the plate for rotating the plate.

16. An apparatus as defined in claim 15 wherein the means for disengaging the members from the stuffed product comprises a cam mounted for rotation between the racks on a shaft mounted in an opening in the plate, said shaft being connected by a lever to one lever of the adjacent pair of levers for clamping the stuffed product.

17. An apparatus as defined in claim 15 wherein the pairs of cooperating levers are spaced 30° apart around the plate.

18. An apparatus as defined in claim 15 wherein the pairs of racks are spaced 60° apart around the plate.

19. An apparatus as defined in claim 15 wherein the means for disengaging the members from the stuffed product comprises a cam mounted for rotation between the racks on a shaft mounted in an opening in the plate, said shaft being connected by a lever to one of the adjacent pairs of levers, and wherein the pairs of cooperating levers are spaced 30° apart around the plate and the pairs of racks are spaced 60° apart around the plate.

20. In an apparatus for forming a stuffed product into a series of integrally connected links comprising a shaft, a rotatable member mounted on the shaft, means adjacent the periphery of the member for clamping the stuffed product at spaced intervals along its length and for supporting the stuffed product during its carriage about the periphery of the member during its rotation, and twisting means between adjacent clamping means for twisting a section of the stuffed product extending between such clamping means, the improvement therein which comprises the provision of a single fixed cam for engaging and disengaging the clamping means with respect to a stuffed product, a single cam for causing actuation of the twisting means, and means interconnecting the twisting means with an adjacent one of the clamping means to effect disengagement of the twisting means from the section of stuffed product upon completion of the twisting thereof by the twisting means.

JOHN D. CONTI.

References Cited in the file of this patent

UNITED STATES PATENTS

| Number | Name | Date |
| --- | --- | --- |
| 1,687,691 | Pfeiffer | Oct. 16, 1928 |
| 1,743,858 | Kruse | Jan. 14, 1930 |
| 1,906,372 | Flynt | May 2, 1933 |
| 2,229,590 | Popp | Jan. 21, 1941 |